Dec. 15, 1925.
F. M. BALDWIN ET AL
1,565,982
SHAFT ACTION SIGNAL DEVICE
Filed Sept. 10, 1923    2 Sheets-Sheet 1
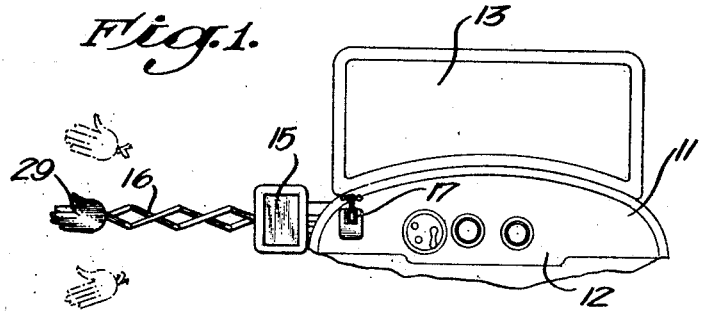
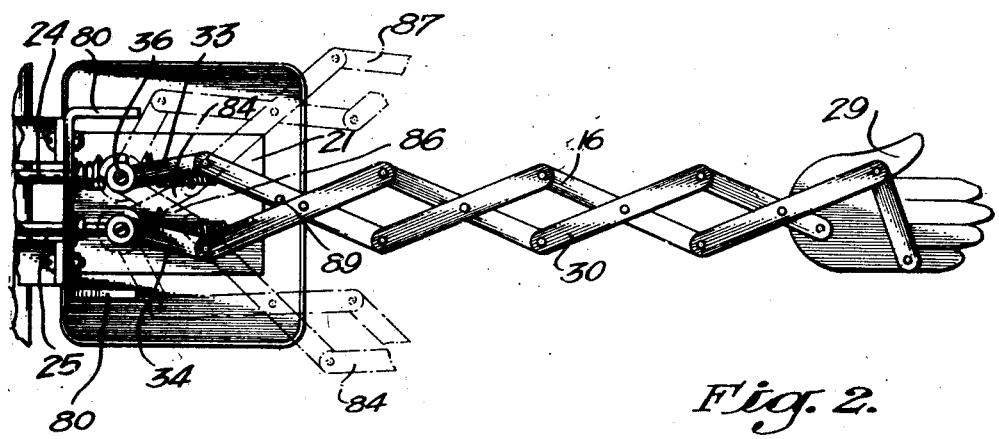
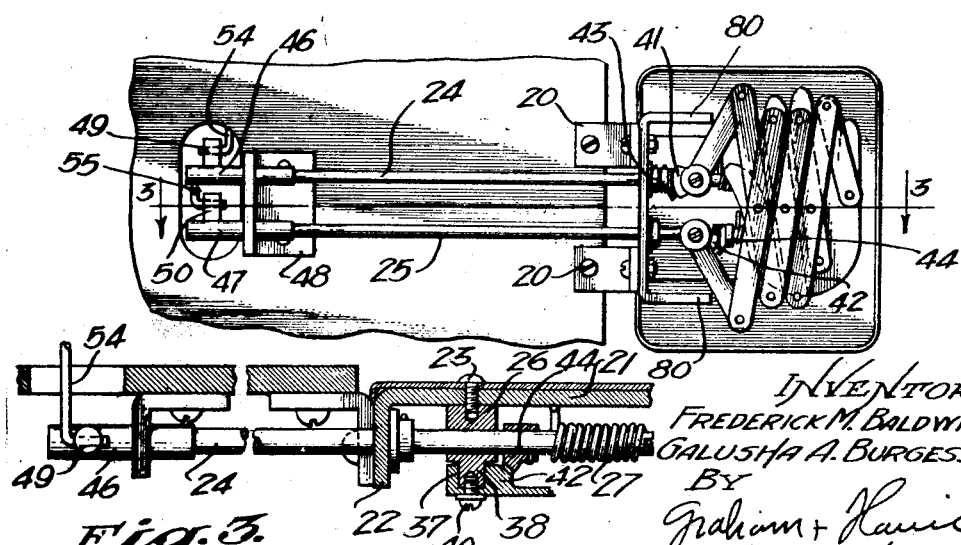
INVENTORS
FREDERICK M. BALDWIN,
GALUSHA A. BURGESS,
BY
Graham + Harris
ATTORNEYS.

Dec. 15, 1925.                                            1,565,982
F. M. BALDWIN ET AL
SHAFT ACTION SIGNAL DEVICE
Filed Sept. 10, 1923          2 Sheets-Sheet 2
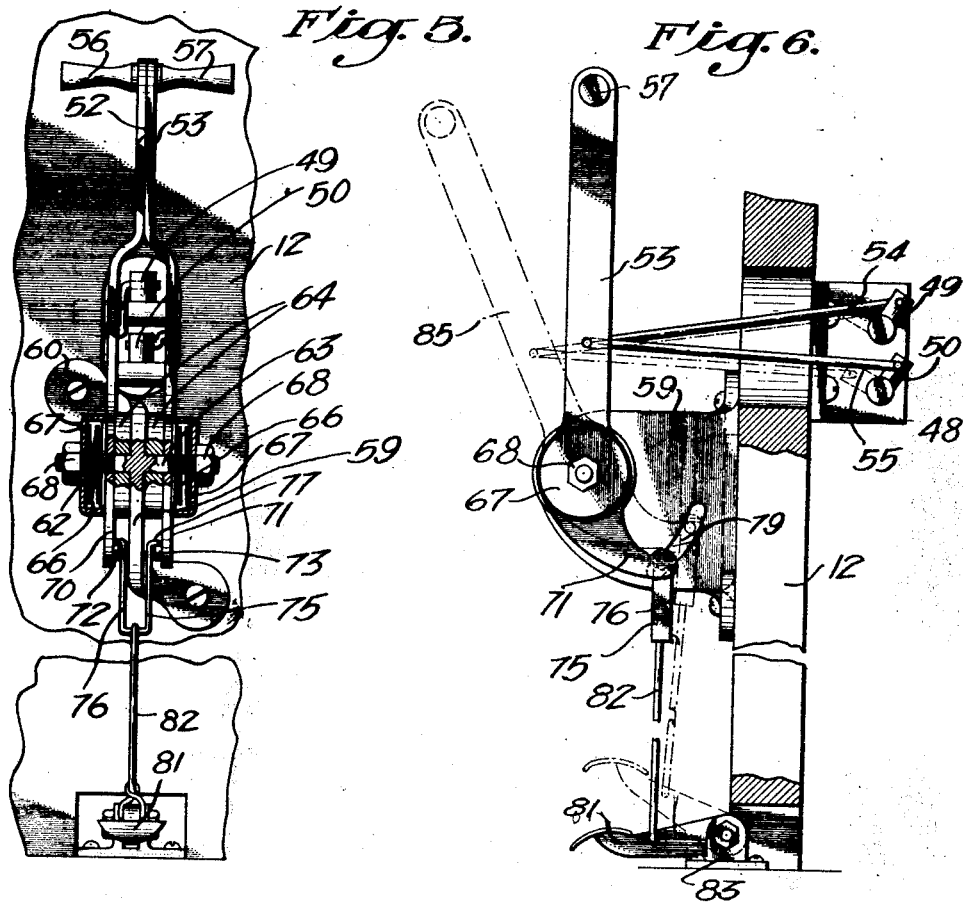

Patented Dec. 15, 1925.

1,565,982

UNITED STATES PATENT OFFICE.

FREDERICK M. BALDWIN, OF LOS ANGELES, AND GALUSHA A. BURGESS, OF LONG BEACH, CALIFORNIA.

SHAFT-ACTION-SIGNAL DEVICE.

Application filed September 10, 1923. Serial No. 661,905.

*To all whom it may concern:*

Be it known that we, FREDERICK M. BALDWIN and GALUSHA A. BURGESS, both citizens of the United States, the former residing at Los Angeles, in the county of Los Angeles, State of California, and the latter residing at Long Beach, in the county of Los Angeles, State of California, have invented a new and useful Shaft-Action-Signal Device, of which the following is a specification.

This invention relates to signaling devices, and relates particularly to a signaling device which may be of especial applicability to automotive vehicles or the like.

Because of the number of vehicles on public thorofares, it has become necessary to devise a standard system of signals whereby one vehicle may signal to other machines and to pedestrians the course he wishes to pursue. In almost every city of the United States it is recognized that if the driver of a vehicle extends his arm diagonally downwardly to the side of the vehicle, he intends to slow the vehicle; horizontally, he intends to turn in the direction of the extension of his hand; and diagonally upwardly, he intends to turn in the opposite direction from the extension of his hand.

It is a principal object of the invention to provide a signaling device in which signaling by means of the driver's arm is simulated, thus providing a mechanical means for imparting a signal which cannot be mistaken by others because such signal is accomplished by the movement of a replica of the human hand.

It is a further object to provide a device of this character which is of very sturdy and dependable construction.

The particular advantages of the invention and further objects will appear in the following description.

Referring to the drawings which are for illustrative purposes only,

Fig. 1 is a diagrammatic view illustrating the utility of the invention, the signal, having the novel features of the invention incorporated therein, being shown applied to an automobile.

Fig. 2 is a rear elevation of my device, the arm member being shown in contracted position within the casing.

Fig. 3 is a horizontal section taken on a plane represented by the line 3—3 of Fig. 2.

Fig. 4 is a rear elevation of my device, similar to Fig. 2, the arm member in this view being shown in extended position.

Fig. 5 is a front elevation showing the lever arrangement for actuating the signaling arm.

Fig. 6 is a side elevation of the lever arrangement shown in Fig. 5.

In Fig. 1 of the drawings 11 represents an automobile having a dash board 12 and a windshield 13. My invention provides a housing 15, which encloses an arm 16 when it is in contracted position. Control levers, for extending the arm in its three positions as indicated, may be conveniently located on the dash'board 12 at 17.

The details of the device are shown in Figs. 2 to 6 inclusive and the construction and operation thereof will be made clear in the following description.

The housing or casing 15 may be mounted to the automobile 11 by any suitable brackets 20, as shown. The casing 15 has a mounting plate 21 attached to the inside thereof, which has the end 22 bent rearwardly as shown. Extending through the end 22 of the plate 21 are shafts 24 and 25 which extend inwardly through the pivot blocks 26 which provide bearings therefor, and have helix springs 27 mounted on the inner ends thereof, the blocks being mounted in the casing by a screw 23. The arm 16 has a replica of a human 29 attached to the outer end thereof. This replica may be suitably made from a flat plate as shown. The arm 16 is made from lazy tongs 30 which are of well known construction, the inner end of which lazy tongs terminate in primary links 33 and 34. The links 33 and 34 may be pivoted at 36 to the pivot blocks 26, the links having bores 37 into which projection 38 formed on the end of the blocks 26 extend. The screws 40 are provided for retaining the links 33 and 34 pivotally in place. Formed integral with the links 33 and 34 are gear segments 41 and 42, which engage complementary segments 43 and 44 mounted on the shafts 24 and 25 resspectively. The segment 41 is formed to the left of the pivot 36, whereas the segment 42 is formed to the right of the pivot 37, therefore by rotating the shafts 24 and 25 in the same direction the links will be made to swing in opposite directions.

The shafts 24 and 25 extend inwardly relative to the automobile and terminate in crank members 46 and 47, a bracket 48 being provided to serve as bearing for crank members 46 and 47. The crank members 46 and 47 have crank arms 49 and 50 formed thereon respectively. The cranks 49 and 50 are linked to operating levers 52 and 53 by rods 54 and 55.

As shown in Figs. 5 and 6 the upper ends of the levers 52 and 53 are provided with handles 56 and 57 which extend outwardly in opposite directions from their respective levers so as to provide expedient means for actuating the levers, either or both of the levers being very easily gripped by one hand of the operator. The lower portions of the levers 52 and 53 are offset as shown so that they will extend to either side of the mounting bracket 59. The bracket 59 has lugs 60 formed therewith for mounting it on the dash board 12 and has horizontally extending pins 62 and 63 on which the levers 52 and 53 are swingably mounted. Friction washers 64 are first placed on the pins, after which the levers 52 and 53 are placed on their respective pins. The springs 66 are then installed in place with protecting cups 67 placed thereover as shown. The function of the springs 66 is to resiliently force the levers 52 and 53 against the washers 64, causing a friction therebetween that will suffice to retain the levers in any position in which they are manually swung. The pressure of the springs may be adjusted by the nuts 68.

On the lower ends 70 and 71 of the levers 52 and 53 are situated inwardly extending projections 73 and 74, which are in contact with the outwardly turned ends 77 of the U-shaped member 75. The legs 76 of the member 75 straddle the mounting bracket 59 as shown, and a pin 78 extends between the upper ends of the legs 76, which pin passes through the slot 79, the slot being congruent with the path which the projections 73 and 74 follow when the levers are swung. The slot 79 is provided to keep the ends 77 of the U-member 75 adjacent to the projections 77 and 74 in any position the lever assumes. The member 75 is connected to a foot pedal 81 by means of a wire or rod 82, the pedal being mounted on the floor board of the machine by a bracket 83.

By pulling the lever 52 forward into the position shown by the broken lines 85 of Fig. 6, the arm 16 may be swung outwardly into a diagonally downward extension, as indicated by the broken lines 84 of Fig. 4. This is due to the rotation of the shaft 24 through the rod 54. The shaft 24 swings the primary link 33 into the position indicated at 84, by the engagement of the segment 43, mounted thereon, with the segment 41 of the link 33. Likewise by pulling the lever 53 forwardly the shaft 25 is rotated and the link 34 is swung into the position indicated at 86, through the engagement of the segments 42 and 44, this rotation of the link 34 causing the arm 16 to assume an upwardly diagonal extension as indicated at 87. By simultaneously pulling on both of the levers 52 and 53, both of the links 33 and 34 are partially rotated and the arm 16 will be made to extend into a horizontal extension as shown by full lines in Fig. 4. The extension of the arm 16 is limited by the pin 89 which engages the adjacent link of the lazy tongs 30 when the arm is extended to a certain point.

The arm 16 is held in extended position by the friction between the arms 52 and 53 and the washers 64. When it is desired to retract the arm 16, the operator presses on the pedal 81 with his foot, which pulls the member 75 downwardly and the levers 52 or 53 back into the position shown by full lines in Fig. 2. The arm readily retracts owing to the provision of the springs 27 which rotate the shaft 24 and 25, thereby causing the arm to retract. The outwardly bent extensions 80 of the mounting member 21 serve as stops for the primary members 33 and 34 and may be tipped with resilient bumpers.

We claim as our invention:

1. In an auto signal, the combination of: an extensible member comprised of lazy tongs extensible in a number of signalling positions; means for extending said lazy tongs; levers operatively connected to said extending means; and frictional means for retaining said levers in the positions into which they are moved for the purpose of operating said extending means; and means for swinging said levers back into their original positions.

2. In an auto signal, the combination of: an extensible member comprised of lazy tongs extensible in a number of signalling positions; means for extending said lazy tongs; levers operatively connected to said extending means; and frictional means for retaining said levers in the positions into which they are moved for the purpose of operating said extending means; and pedal operated means for swinging said levers back into their original positions.

3. In a display signal of the class described, the combination of: a casing; a lazy tong having primary links, said primary links being pivoted in said casing; gear segments mounted on said primary links; shafts extending into said casing; levers for rotating said shafts; gears mounted on said shafts engaging said gear segments for selectively extending said lazy tongs into various extended positions; and means for retracting said lazy tongs.

4. In a display signal of the class described, the combination of: a casing; a lazy tong having primary links, pivoted in said casing; gear segments mounted on said primary links; shafts extending into said casing; manually operable frictionally retained levers for rotating said shaft; rods connecting said levers and said shafts; gears mounted on said shafts engaging said gear segments for extending said lazy tongs; means associated with said levers for retracting said lazy tongs; and springs mounted on said shafts for resiliently maintaining said lazy tongs in contracted position.

5. In a display signal of the class described, the combination of: a casing; a lazy tong having primary links, pivoted in said casing; gear segments mounted on said primary links; shafts extending into said casing; manually operable frictionally retained levers for rotating said shaft; rods connecting said levers and said shafts; gears mounted on said shafts engaging said gear segments for extending said lazy tongs; a foot pedal associated with said levers for retracting said lazy tongs; and springs mounted on said shafts for resiliently maintaining said lazy tongs in contracted position.

In testimony whereof, we have hereunto set our hands at Los Angeles, California, this 31st day of August, 1923.

FREDERICK M. BALDWIN.
GALUSHA A. BURGESS.